United States Patent
Kaltenbronn et al.

[15] 3,682,976
[45] Aug. 8, 1972

[54] PHENYL BENZOFURAN ACETIC ACID COMPOUNDS

[72] Inventors: James S. Kaltenbronn, Ann Arbor; Franklin W. Short, Saline, both of Mich.

[73] Assignee: Parke, Davis & Company, Detroit, Mich.

[22] Filed: Feb. 16, 1970

[21] Appl. No.: 11,856

[52] U.S. Cl............260/346.2 R, 424/285, 260/592, 260/600
[51] Int. Cl. .............................................C07d 5/42
[58] Field of Search...............................260/346.2 R

[56] References Cited

OTHER PUBLICATIONS

Chatterjea, Chem. Abstracts (1957) Vol. 51, 6594f–6595 (page 6295b especially)

*Primary Examiner*—Alex Mazel
*Assistant Examiner*—Bernard Dentz
*Attorney*—Robert R. Adams, David B. Ehrlinger, George M. Richards and Edward J. Gall

[57] ABSTRACT

3-Phenyl-7-benzofuranacetic acids, 4-phenyl-7-benzofuranacetic acids, 7-phenyl-4-benzofuranacetic acids, 2-methyl-7-phenyl-4-benzofuranacetic acids, and 7-phenyl-3-benzofuranacetic acids, optionally substituted in the phenyl group by fluorine or chlorine and on the $\alpha$-carbon group by lower alkyl; carboxylate salts thereof; and their production by hydrolysis of a correspondingly substituted carboxylic acid precursor or by decarboxylation by heating of a malonic acid precursor. The compounds of the invention are useful as anti-inflammatory agents.

6 Claims, No Drawings

PHENYL BENZOFURAN ACETIC ACID COMPOUNDS

SUMMARY AND DETAILED DESCRIPTION

The present invention relates to new heterocyclic acid compounds that are useful as pharmacological agents and to methods for their production. More particularly, the invention relates to new benzofuranacetic acid compounds that can be represented by the formula

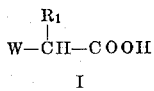

I and to pharmaceutically acceptable salts thereof; where $R_1$ is hydrogen or a lower alkyl group having not more than four carbon atoms and W represents a 3-phenyl-7-benzofuran- group having the formula

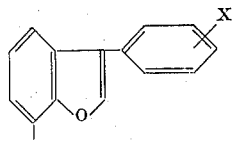

II a 4-phenyl-7-benzofuran- group having the formula

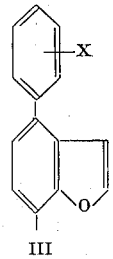

III a 7-phenyl-4-benzofuran- group having the formula

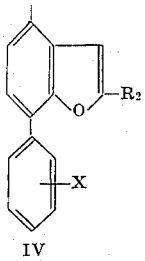

IV or a 7-phenyl-3-benzofuran- group having the formula

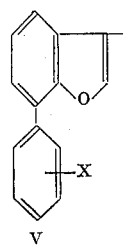

V where $R_2$ is hydrogen or methyl and X is hydrogen, fluorine, or chlorine.

In accordance with the invention, benzofuranacetic acid compounds having the formula

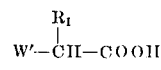

VI and salts thereof are produced by hydrolyzing a compound that can be represented by the formula

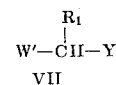

VII where $R_1$ is defined as above, W' represents 3-phenyl-7-benzofuran-, 4-phenyl-7-benzofuran-, or 7-phenyl-4-benzofuran-, as defined by the foregoing formulas II, III, and IV, respectively, and Y is a group hydrolyzable to a carboxyl group. Some examples of groups hydrolyzable to a carboxyl group are cyano, alkoxycarbonyl, aryloxycarbonyl, aralkoxycarbonyl, carbamoyl, alkyl-substituted carbamoyl, trihalomethyl, amidino, alkyl-substituted amidino, haloformyl,

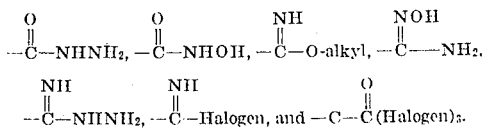

The precise nature of the group Y that is hydrolyzable to a carboxyl group is not critical because during the course of the process it is converted to a carboxyl group. Therefore, if desired, the group Y in appropriate cases can contain one or more substituents such as lower alkyl, lower alkoxy, halogen, nitro, carboxy, or alkoxycarbonyl, and in those cases where the group Y is basic, it can also be employed in the form of an acid-addition salt. As used herein, the term "group hydrolyzable to a carboxyl group" designates substituted as well as unsubstituted radicals. Compounds in which the group Y is the cyano group or an alkoxycarbonyl group are preferred starting materials in the process because they are readily available and are hydrolyzable to the carboxyl derivatives in high yields.

The hydrolysis can be carried out under either acidic or alkaline conditions, by the use of an acidic or alkaline hydrolytic agent. Alkaline conditions are preferred and should be used exclusively with certain of the Y groups, for example, with the

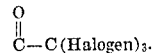

group. The hydrolysis can be carried out in water or in an aqueous solution of an unreactive, water-miscible, organic solvent, such as an aliphatic alcohol, dioxane, tetrahydrofuran, ethylene glycol, propylene glycol, or a lower alkyl ether of ethylene glycol or of diethylene glycol, to which has been added an acid or a base to render the medium acidic or alkaline. Some examples of suitable bases are alkali metal hydroxides, alkaline earth metal hydroxides, alkali metal carbonates, alkali metal alkoxides, and trialkylammonium hydroxides. Some examples of suitable acids are mineral acids, except sulfuric acid, strong organic acids, such as p-toluenesulfonic acid, and acidic ion exchange resins. Preferred agents are alkali metal hydroxides, such as sodium hydroxide and potassium hydroxide. The hydrolytic agent is normally employed in considerable excess.

The hydrolysis is carried out by heating a solution or suspension of the starting material in a solvent medium containing a suitable acid or a base until hydrolysis of the group Y is substantially complete. The required time and temperature will vary depending upon the nature of the specific starting material of formula VII that is employed and upon the basic or acidic agent used. In general, however, the reaction is carried out at a temperature between about 25° and 200° C. or at the reflux temperature of the solvent, during a period that may vary from 1 to 75 hours. When using an acidic hydrolytic agent, care should be taken to avoid high temperatures and long reaction times, in order to minimize the possibility of splitting open the furan ring. When using one of the preferred basic hydrolytic agents, the reaction is usually carried out at a temperature between 60° and 125° C. and is substantially complete within 12–24 hours. When the hydrolysis is carried out under alkaline conditions, the product is present in the reaction mixture in the form of a salt; it can be isolated in this form, or following treatment with an acid, preferably a mineral acid, it can be isolated as the free acid. When the hydrolysis is carried out under acidic conditions, the product is present in the reaction mixture as the free acid, and it can be isolated directly in this form, or by subsequent treatment with a base, it can be isolated in salt form.

Starting materials required for use in the foregoing process can be prepared in a number of ways. For example, various 3-phenyl-7-benzofuranacetonitriles can be prepared by the following series of reactions. o-Bromophenol is reacted with a phenacyl halide having the formula

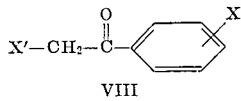

VIII to give a 2-(o-bromophenoxy)acetophenone having the formula

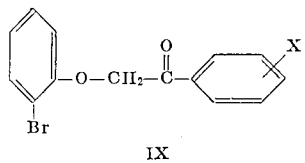

IX

This intermediate is next cyclized by reaction with phosphorus pentoxide in phosphoric acid and the resulting 7-bromo-3-phenylbenzofuran, having the formula,

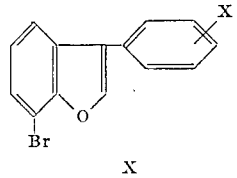

X is reacted successively with magnesium and paraformaldehyde to give, following hydrolysis, a 3-phenyl-7-benzofuranmethanol having the formula

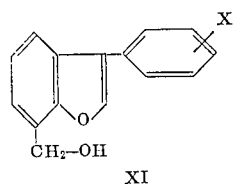

XI

This intermediate is then reacted with phosphorus tribromide to give a 3-phenyl-7-benzofuranmethyl bromide having the formula

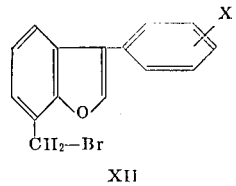

XII which is finally reacted with sodium cyanide in aqueous acetone to give one of the desired 3-phenyl-7-benzofuranacetonitrile starting materials having the formula

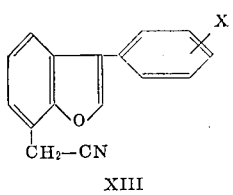

XIII

In formulas VIII to XIII, X has the same meaning as previously given and X' is chlorine or bromine.

Also, for example, various ethyl 2-methyl-7-phenyl-4-benzofuranacetate starting materials can be prepared by the following series of reactions. A 4-phenyl-1,3-cyclohexanedione is reacted with 1-chloro-2-propanone to give a 2-acetonyl-4-phenyl-1,3-cyclohexanedione having the formula

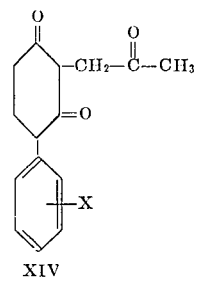

XIV

This intermediate is next cyclized by heating it in toluene solution in the presence of p-toluenesulfonic acid under reflux under a water separator to give a mixture of a 6,7-dihydro-2-methyl-5-phenylbenzofuran-4(5H)-one and a 6,7-dihydro-2-methyl-7-phenylbenzofuran-4(5H)-one, which is separated into its components with the aid of (carboxymethyl) trimethylammonium chloride hydrazide (Girard's Reagent T). The 6,7-dihydro-2-methyl-7-phenylbenzofuran-4(5H)-one intermediate, having the formula,

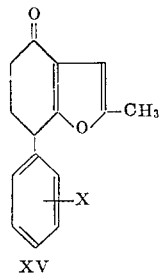

XV is next reacted with an ethyl bromoacetate compound having the formula

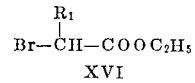

XVI in the presence of zinc, followed by treatment of the reaction product with a strong acid, such as sulfuric acid, to produce an ethyl 6,7-dihydro-2-methyl-7-phenylbenzofuranacetate or an ethyl 6,7-dihydro-2-methyl-7-phenylbenzofuran-$\Delta^{4(5H)\alpha}$-acetate or a mixture of both that can be represented by the formula

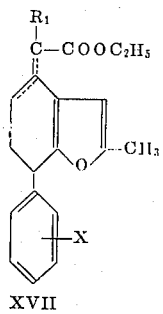

XVII which ethyl ester or mixture of ethyl esters is heated at about 190°–230° C. in the presence of a dehydrogenating agent, such as sulfur, to give one of the desired ethyl 2-methyl-7-phenyl-4-benzofuranacetate starting materials having the formula

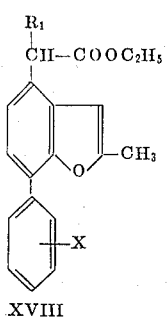

XVIII

In formulas XIV to XVIII, $R_1$ and X have the same meaning as given earlier. In formula XVII above, the dotted lines are meant to represent both intermediate esters and also to show that the product represented thereby is, in certain cases, particularly when $R_1$ is lower alkyl, a mixture consisting of an ester having an endocyclic double bond ($\Delta^{4,5}$) and a corresponding ester having an exocyclic double bond ($\Delta^{4(5H),\alpha}$).

Further, by way of example, α-alkyl-3-phenyl-7-benzofuranacetonitrile starting materials for use in the process described above are prepared by reacting a 3-phenyl-7-benzofuranacetonitrile having formula XIII above first with sodium hydride and then reacting the sodium salt obtained with an alkyl halide having the formula

XIX to give the desired starting material having the formula

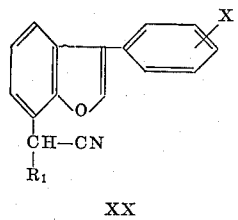

XX where $R_1$ and X are as defined previously and Hal represents chlorine, bromine, or iodine.

The preparation of specific examples of the starting materials described above and others required for the practice of the invention is described in detail hereinafter.

Also in accordance with the invention, 7-phenyl-3-benzofuranacetic acid compounds having the formula

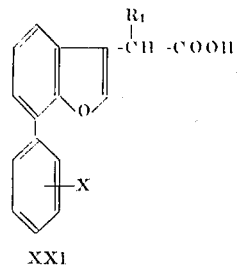

XXI are produced by heating a 7-phenyl-3-benzofuranmalonic acid compound having the formula

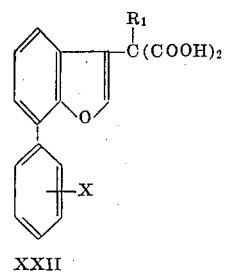

XXII at an elevated temperature; where $R_1$ and X have the aforementioned significance. The heating process is best carried out in the absence of any solvent at a temperature in the range of from 150° to 250° C. The duration of heating will depend somewhat on the temperature, but normally the decarboxylation that is accomplished by the heating is essentially complete after about 30 to 60 minutes. In any event, the completion of the process can be determined by observing the cessation of carbon dioxide evolution. Upon completion of the decarboxylation by heating, the 7-phenyl-3-benzofuranacetic acid product is cooled, isolated, and purified according to conventional methods.

The 7-phenyl-3-benzofuranmalonic acid starting materials required for use in the foregoing process can be prepared by the following series of reactions. An aniline compound having the formula

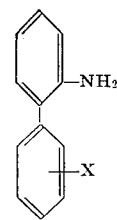

XXIII is diazotized by reaction with sodium nitrite in a mixture of acetic acid and sulfuric acid, and the resulting diazonium salt is reacted with 50 percent sulfuric acid to give a phenol having the formula

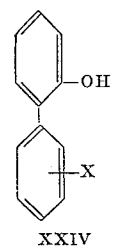

XXIV

This phenol intermediate is next reacted with ethyl bromoacetate and potassium carbonate, followed by hydrolysis, to produce an acetic acid compound having the formula

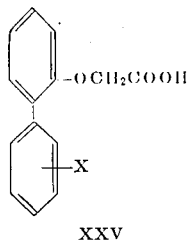

XXV which in turn is reacted with thionyl chloride to produce an acetyl chloride compound having the formula

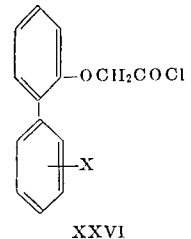

XXVI

This intermediate is then reacted with an adduct prepared from a malonic ester, ethanol, and magnesium that can be represented by the formula

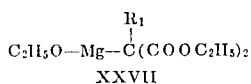

XXVII to give, following hydrolysis, a malonic ester compound having the formula

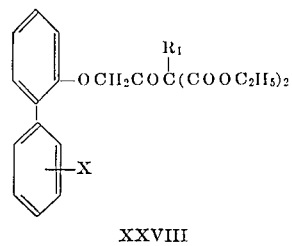

XXVIII which is cyclized by reaction with phosphorus pentoxide in phosphoric acid, and the 7-phenyl-3-benzofuranmalonic ester obtained, having the formula,

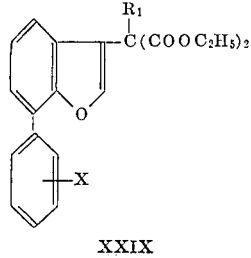

XXIX is finally hydrolyzed by reaction with potassium hydroxide in aqueous ethanol to give, following acidification, one of the desired 7-phenyl-3-benzofuranmalonic acid starting materials having formula XXII above. In the foregoing formulas, XXIII to XXIX, $R_1$ and X have the same meaning as previously given.

The free carboxylic acid compounds of the invention, represented by formula I above, form carboxylate salts with a variety of inorganic and organic bases. Pharmaceutically acceptable salts are formed with such bases as sodium hydroxide, potassium hydroxide, calcium hydroxide, sodium carbonate, potassium bicarbonate, ammonia, diethylamine, 2-hydroxyethylamine, and choline. Pharmaceutically acceptable magnesium and aluminum salts are formed by reacting the sodium salt or other soluble carboxylate salt with magnesium chloride or aluminum chloride in an aqueous medium. The preferred carboxylate salts of the invention are the salts of an alkali metal, an alkaline earth metal, aluminum, ammonia, or a substituted ammonia. The carboxylic acids and their salts are interconvertible by adjustment of the pH. They differ with respect to certain physical properties, such as solubility in polar solvents, but are otherwise equivalent for purposes of the invention.

If desired, the compounds of the invention wherein $R_1$ is lower alkyl can also be obtained in optically active forms by resolving an optically inactive free acid final product by fractional crystallization of a salt formed with an optically active base.

The compounds of the invention are new chemical compounds that are useful as pharmacological agents, especially as anti-inflammatory agents. As such, they are of value in mitigating the symptoms associated with inflammatory conditions as well as in preventing or suppressing the occurrence of inflammation. Their anti-inflammatory activity is demonstrable and quantitatively measurable by means of a test designed to measure the ability of a compound to delay the normal appearance of an erythema in animals exposed to ultraviolet radiation under standardized conditions. The test procedure that is used has been described in *Archives Internationales de Pharmacodynamie et de Therapie*, Vol. 116, pages 261-292, 1958. This test has been found to be a reliable indicator of anti-inflammatory activity, as demonstrated, for example, for the known clinically useful agents, aminopyrine, antipyrine, and aspirin. The activities of some representative compounds of the present invention, as determined by this standard test procedure are tabulated below. In the table, the activities are expressed in terms of the minimum dose that was effective in delaying the appearance of an erythema.

ANTI-INFLAMMATORY ACTIVITY

| Compound | Minimum Effective Dose, mg./kg. |
|---|---|
| 3-phenyl-7-benzofuranacetic acid | 0.8 |
| α-methyl-3-phenyl-7-benzofuranacetic acid | 1.6 |
| 3-(o-fluorophenyl)-7-benzofuranacetic acid | 0.2 |
| 4-phenyl-7-benzofuranacetic acid | 0.4 |
| 2-methyl-7-phenyl-4-benzofuranacetic acid | 3.1 |
| 7-phenyl-3-benzofuranacetic acid | 0.4 |

The compounds of the invention are preferably administered by the oral route although parenteral administration can also be used. They can be employed in either free acid or salt form and can be combined with either a solid or liquid carrier or diluent and made available in varying amounts in such pharmaceutical

EXAMPLE 1

To a solution of 5.0 g. of 3-phenyl-7-benzofuranacetonitrile in 25 ml. of ethanol and 50 ml. of tetrahydrofuran is added a solution of 5.0 g. of potassium hydroxide in 25 ml. of water, and the resulting mixture is heated under reflux for 18 hours and then evaporated to dryness under reduced pressure. The residue is dissolved in water, and the aqueous solution is washed twice with ether and acidified with dilute hydrochloric acid. The solid 3-phenyl-7-benzofuranacetic acid that precipitates is isolated, dried, and crystallized successively from benzene and benzene-hexane; m.p. 144°–146° C.

To a solution of 2.5 g. of 3-phenyl-7-benzofuranacetic acid in 10 ml. of hot ethanol is added 10 ml. of 1 N aqueous sodium hydroxide, and the resulting solution is evaporated to dryness under reduced pressure to give sodium 3-phenyl-7-benzofuranacetate.

To a solution of 2.7 g. of sodium 3-phenyl-7-benzofuranacetate in 50 ml. of methanol is added with stirring a solution of 1.4 g. of choline chloride in 10 ml. of methanol. The resulting mixture is stirred for 1 hour and filtered to remove the insoluble sodium chloride, and the filtrate is evaporated to dryness under reduced pressure to give 3-phenyl-7-benzofuranacetic acid choline salt.

EXAMPLE 2

Utilizing the procedure described in Example 1 above, the following benzofuranacetic acid compounds are obtained from the reactions indicated below.

a. α-Methyl-3-phenyl-7-benzofuranacetic acid, m.p. 165.5°–167° C., following crystallization from benzene; from the reaction of 5.8 g. of α-methyl-3-phenyl-7-benzofuranacetonitrile in 115 ml. of ethanol with a solution of 6.0 g. of potassium hydroxide in 40 ml. of water.

b. α-Ethyl-3-phenyl-7-benzofuranacetic acid, m.p. 159°–160.5° C., following crystallization from ethanol; from the reaction of 6.1 g. of α-ethyl-3-phenyl-7-benzofuranacetonitrile in 150 ml. of methanol with 6.0 g. of potassium hydroxide in 40 ml. of water.

EXAMPLE 3

To a solution of 6.4 g. of 3-phenyl-α-propyl-7-benzofuranacetonitrile in 65 ml. of ethanol is added a solution of 6.4 g. of potassium hydroxide in 40 ml. of water, and the resulting mixture is heated under reflux for 48 hours and then evaporated to dryness under reduced pressure. The residue is dissolved in water, and the aqueous solution is washed twice with ether and acidified with dilute hydrochloric acid. The oily precipitate obtained is isolated and extracted with ether. The ether extracts are washed with water until neutral, dried, and evaporated to dryness under reduced pressure. The oily residue again obtained is poured onto a column prepared from 220 g. of silica gel, the column is eluted with a 9:1 benzene-ether mixture, and the eluates are combined and evaporated to give a solid residue of 3-phenyl-α-propyl-7-benzofuranacetic acid; m.p. 110.5°–112° C., following crystallization from benzene-hexane.

EXAMPLE 4

Utilizing the procedure described in Example 1 above, the following benzofuranacetic acid compounds are obtained from the reactions indicated below.

a. 3-(o-Fluorophenyl)-7-benzofuranacetic acid, m.p. 127.5°–129° C., following crystallization from benzene-hexane; from the reaction of 0.8 g. of 3-(o-fluorophenyl)-7-benzofuranacetonitrile in 15 ml. of ethanol and 2 ml. of dioxane with a solution of 0.8 g. of potassium hydroxide in 5 ml. of water.

b. 3-(o-Chlorophenyl)-7-benzofuranacetic acid, m.p. 132°–133° C., following crystallization from benzene-hexane; from the reaction of 2.1 g. of 3-(o-chlorophenyl)-7-benzofuranacetonitrile in 25 ml. of ethanol with a solution of 2.1 g. of potassium hydroxide in 10 ml. of water.

c. 3-(p-Fluorophenyl)-7-benzofuranacetic acid, m.p. 168.5°–170° C., following crystallization from benzene; from the reaction of 3.8 g. of 3-(p-fluorophenyl)-7-benzofuranacetonitrile in 50 ml. of ethanol, 10 ml. of dioxane, and 15 ml. of tetrahydrofuran with a solution of 4.0 g. of potassium hydroxide in 20 ml. of water.

d. 3-(p-Chlorophenyl)-7-benzofuranacetic acid, m.p. 171°–173° C., following crystallization from benzene; from the reaction of 8.0 g. of 3-(p-chlorophenyl)-7-benzofuranacetonitrile in 80 ml. of ethanol, 40 ml. of dioxane, and 25 ml. of tetrahydrofuran with a solution of 8.0 g. of potassium hydroxide in 45 ml. of water.

EXAMPLE 5

A solution of 4.0 g. of potassium hydroxide in 25 ml. of water is added to a solution of 4.0 g. of 4-phenyl-7-benzofuranacetonitrile in 50 ml. of methanol and 10 ml. of tetrahydrofuran, and the resulting mixture is heated under reflux for 11 hours and then evaporated to dryness under reduced pressure. The residue is dissolved in water, and the aqueous solution is washed twice with ether and acidified with dilute hydrochloric acid. The solid 4-phenyl-7-benzofuranacetic acid that precipitates is isolated, dried, and purified by successive crystallizations from benzene and benzene-hexane; m.p. 164°–166° C.

Utilizing the foregoing procedure, from the reaction of 5.0 g. of 4-(p-fluorophenyl)-7-benzofuranacetonitrile in 50 ml. of ethanol and 20 ml. of tetrahydrofuran with 5 g. of potassium hydroxide in 30 ml. of water, there is obtained 4-(p-fluorophenyl)-7-benzofuranacetic acid after purification by chromatography on silica gel according to the procedure described earlier.

EXAMPLE 6

A mixture consisting of 25.8 g. of ethyl 2-methyl-7-phenyl-4-benzofuranacetate, 16.0 g. of 50 percent aqueous sodium hydroxide, and 500 ml. of ethanol is heated under reflux for 6 hours and is then evaporated to dryness under reduced pressure. The residue is dissolved in water, and the aqueous solution is acidified with 6 N hydrochloric acid. The acidic aqueous mixture is extracted with benzene, and the benzene extracts are washed with water, dried over anhydrous sodium sulfate, and evaporated to dryness under reduced pressure. The oily residue is poured onto a column prepared from 1,000 g. of silica gel, the column is eluted with a 9:1 benzene-ether mixture, and the eluates are combined and evaporated to give an oil that solidifies upon trituration with hot hexane. The solid product is 2-methyl-7-phenyl-4-benzofuranacetic acid; m.p. 106.5°–107.5° C., following crystallization from aqueous ethanol. The ammonium salt is obtained by dissolving a small portion of the free acid product in ethanol, treating the solution with excess ammoniacal ethanol, and evaporating the resulting mixture to dryness under reduced pressure to give the solid ammonium salt. The calcium salt is obtained by neutralizing an ethanolic solution of the free acid with aqueous calcium hydroxide and freeze-drying the neutral aqueous solution.

EXAMPLE 7

Utilizing the procedure described in Example 6 above, the following benzofuranacetic acid compounds are obtained from the reactions indicated below.

a. α-Methyl-7-phenyl-4-benzofuranacetic acid; from the reaction of ethyl α-methyl-7-phenyl-4-benzofuranacetate with 50 percent aqueous sodium hydroxide in ethanol.

b. 7-(o-Fluoropheryl)-α-methyl-4-benzofuranacetic acid; from the reaction of ethyl 7-(o-fluorophenyl)-α-methyl-4-benzofuranacetate with 50 percent aqueous sodium hydroxide in ethanol.

c. 7-(o-Chlorophenyl)-4-benzofuranacetic acid; from the reaction of ethyl 7-(o-chlorophenyl)-4-benzofuranacetate with 50 percent aqueous sodium hydroxide in ethanol.

EXAMPLE 8

7-Phenyl-3-benzofuranmalonic acid (8.0 g.) is heated at 210°–255° C. for about 30 minutes or until gas evolution ceases. Upon cooling, the residue is dissolved in ether, and the ether solution is extracted twice with 5 percent aqueous potassium hydroxide. The combined basic extracts are acidified with dilute hydrochloric acid, and the oily precipitate that is obtained is extracted into ether. The ether extract is washed with water, dried, and evaporated to dryness under reduced pressure. The black oily residue is poured onto a column of silica gel, the column is eluted with a 9:1 benzene-ether mixture, and the eluates are combined and evaporated to give a solid residue of 7-phenyl-3-benzofuranacetic acid; m.p. 152°–153° C., following successive crystallizations from benzene and benzene-hexane.

To a solution of 2.5 g. of 7-phenyl-3-benzofuranacetic acid in 10 ml. of hot ethanol is added 10 ml. of 1 N aqueous sodium hydroxide, and the resulting solution is evaporated to dryness under reduced pressure to give sodium 7-phenyl-3-benzofuranacetate.

To a solution of 2.7 g. of sodium 7-phenyl-3-benzofuranacetate in 50 ml. of methanol is added with stirring a solution of 1.4 g. of choline chloride in 10 ml. of methanol. The resulting mixture is stirred for 1 hour and filtered to remove the insoluble sodium chloride, and the filtrate is evaporated to dryness under reduced pressure to give 7-phenyl-3-benzofuranacetic acid choline salt.

Utilizing the procedures described above, with the substitution of 8.0 g. of 7-(o-fluorophenyl)-3-benzofuranmalonic acid for the 7-phenyl-3-benzofuranmalonic acid, there are obtained 7-(o-fluorophenyl)-3-benzofuranacetic acid and the sodium and choline salts thereof.

STARTING MATERIALS

The various starting materials and intermediates required for their preparation are obtained by the methods described in the following.

A. 2-(o-Bromophenoxy)acetophenones 1. 2-(o-Bromophenoxy)acetophenone. To a solution of 100 g. of o-bromophenol and 89.6 g. of 2-chloroacetophenone in 1 liter of acetone is added 207 g. of potassium carbonate, and the resulting mixture is stirred and heated under reflux for about 18 hours, cooled, and filtered. The filtrate is evaporated under reduced pressure to give a solid residue of 2-(o-bromophenoxy)acetophenone; m.p. 113°–115° C., following two crystallizations from ethanol.

2. 2-(o-Bromophenoxy)-o-fluoroacetophenone. To a solution of 59.8 g. of o-fluoroacetophenone in 200 ml. of carbon tetrachloride is added dropwise a solution of 69.3 g. of bromine in 200 ml. of carbon tetrachloride. When addition is complete, the resulting solution is flushed with nitrogen to remove hydrogen bromide and is then evaporated under reduced pressure. The residue is distilled under reduced pressure to give 2-bromo-o-fluoroacetophenone; b.p. 66°–100° C./0.2–0.4 mm. Hg. This intermediate product is reacted with o-bromophenol and potassium carbonate in acetone according to the procedure of (1) above to give the desired 2-(o-bromophenoxy)-o-fluoroacetophenone; m.p. 96°–97° C., following crystallization from ethanol.

3. 2-(o-Bromophenoxy)-o-chloroacetophenone, m.p. 69°–72° C., following two crystallizations from ethanol; from the reaction of o-bromophenol with 2-bromo-o-chloroacetophenone and potassium carbonate in acetone according to the procedure described in (1) above.

4. 2-(o-Bromophenoxy)-p-fluoroacetophenone, m.p. 124.5°–126.5° C., following two crystallizations from ethanol; from the reaction of o-bromophenol with 2-bromo-p-fluoroacetophenone and potassium carbonate in acetone according to the procedure of (1) above.

5. 2-(o-Bromophenoxy)-p-chloroacetophenone, m.p. 111°–113° C., following two crystallizations from ethanol; from the reaction of o-bromophenol with 2-bromo-p-chloroacetophenone and potassium carbonate in acetone according to the procedure of (1) above.

B. Bromine-substituted benzofurans 1. 7-Bromo-3-phenylbenzofuran. To a mixture formed by adding 900 g. of phosphorus pentoxide to 695 ml. of phosphoric acid, cooled below 72° C., is added 91.5 g. of 2-(o-bromophenoxy)acetophenone. The resulting mixture is heated at 78°–83° C. for 28 hours and is then poured into water to give a solid precipitate of 7-bromo-3-phenylbenzofuran, which is isolated, dried, and crystallized from hexane; m.p. 71.5°–73° C.

2. 7-Bromo-3-(o-fluorophenyl)benzofuran. A mixture of 41.3 g. of 2-(o-bromophenoxy)-o-fluoroacetophenone and 680 g. of polyphosphoric acid is heated at 80° C. for about 18 hours, cooled, and poured into water to give a solid precipitate of 7-

3. 7-Bromo-3-(o-chlorophenyl)benzofuran. A mixture of 20.6 g. of 2-(o-bromophenoxy)-o-chloroacetophenone and 400 g. of polyphosphoric acid is stirred and heated at 80° C. for about 18 hours, cooled, and poured into water. The resulting aqueous mixture is extracted with ether, and the ether extract is washed with water, with saturated aqueous sodium bicarbonate, and with water again until it is neutral, dried, and evaporated under reduced pressure. The oily residue obtained is distilled under reduced pressure to give 7-bromo-3-(o-chlorophenyl)benzofuran contaminated with a small amount of unreacted starting material. The distillate, b.p. 151°–164° C./0.2 mm. Hg., is dissolved in 170 ml. of absolute ethanol, 1 g. of (carboxymethyl)trimethylammonium chloride hydrazide (Girard's T Reagent) and 1 ml. of acetic acid are added to the solution, and the resulting mixture is heated under reflux for 1 hour. Ethylene glycol (170 ml.) is then added to the solution, and the ethanol is evaporated under reduced pressure. The concentrated solution is then extracted twice with ether, and the combined ether extracts are washed successively with water, saturated aqueous sodium bicarbonate, and water again until neutral, dried, and evaporated to dryness under reduced pressure to give the desired 7-bromo-3-(o-chlorophenyl)benzofuran; b.p. 155°–162° C./0.2 mm. Hg.

4. 7-Bromo-3-(p-fluorophenyl)benzofuran, m.p. 87°–89 C., following crystallization from hexane; from the reaction of 22.0 g. of 2-(o-bromophenoxy)-p-fluoroacetophenone with 350 g. of polyphosphoric acid according to the procedure described in B (2) above.

5. 7-Bromo-3-(p-chlorophenyl)benzofuran, m.p. 115°–116.5° C., following crystallization from hexane; from the reaction of 122 g. of 2-(o-bromophenoxy)-p-chloroacetophenone with 2,000 g. of polyphosphoric acid according to the procedure described in B (2) above.

6. 7-Bromo-4-phenylbenzofuran. To a stirred mixture of 55.0 g. of 2-bromo-5-phenylaniline, 500 ml. of acetic acid, and 50 ml. of sulfuric acid, cooled to 10° C., is added a solution of 15.4 g. of sodium nitrite in 100 ml. of water. The resulting mixture is stirred for 15 minutes at 10° C. and then added dropwise to 500 ml. of boiling 50 percent sulfuric acid, and the reaction mixture is heated under reflux for 10 minutes. Upon cooling, there is obtained a solid precipitate, which is isolated, dried, and distilled under reduced pressure. The oily distillate, collected between 140° and 165° C. at 0.2–0.25 mm. Hg., solidifies on standing to give 2-bromo-5-phenylphenol; m.p. 61°–63° C., following crystallization from hexane.

A mixture consisting of 16.2 g. of 2-bromo-5-phenylphenol, 12.9 g. of bromoacetaldehyde, diethyl acetal, 3.52 g. of sodium methoxide, and 35 ml. of absolute ethanol is heated at 160° C. in a sealed reaction vessel for about 18 hours. Upon cooling, the reaction mixture is evaporated to remove solvent, and the residue obtained is dissolved in ether. The ether solution is washed successively with water, saturated aqueous sodium bicarbonate, and water again until neutral, dried, and evaporated to dryness under reduced pressure to give a solid residue of 2-bromo-5-phenylphenoxyacetaldehyde diethyl acetal, suitable for use without further purification.

To a mixture of 197 g. of phosphorus pentoxide and 150 ml. of phosphoric acid, stirred and heated at 80° C., is added dropwise 20 g. of 2-bromo-5-phenylphenoxyacetaldehyde diethyl acetal, and the resulting mixture is stirred and heated at 80° C. for about 18 hours. The mixture is then cooled and poured into water, and the aqueous mixture is extracted with ether. The ether extract is washed with water, with 5 percent aqueous potassium hydroxide, and with water again until neutral, dried, and evaporated to dryness to give a black oily residue, which is poured onto a column of neutral alumina. The column is eluted with benzene, and the combined benzene eluates are evaporated to give the desired 7-bromo- 4-phenylbenzofuran; m.p. 79°–81 C., following crystallization from ethanol.

7. 7-Bromo-4-(p-fluorophenyl)benzofuran. To a solution of 100 g. of 4-(p-fluorophenyl)aniline in 500 ml. of acetic acid is added 109 g. of acetic anhydride, and the resulting mixture is heated under reflux for 1 hour. The solution obtained is cooled and poured onto ice, and the solid precipitate of 4-(p-fluorophenyl)acetanilide that is obtained is isolated, dried, and used without further purification. To a solution of 120 g. of this first intermediate in 1 liter of acetic acid, heated to 70° C., is added dropwise a solution of 120 g. of nitric acid in 80 ml. of acetic acid. The resulting mixture is heated at 70° C. for 1 hour, allowed to cool to room temperature over a period of 45 minutes, and then poured into water. The solid precipitate of 4-(p-fluorophenyl)-2-nitroacetanilide that is obtained is isolated, dried, and used in the next step without further purification.

To a solution of 80 g. of 4-(p-fluorophenyl)-2-nitroacetanilide in 800 ml. of ethanol, heated under reflux, is added a solution of 37.8 g. of potassium hydroxide in 130 ml. of water, and the resulting mixture is heated under reflux for about 18 hours. The mixture is then concentrated under reduced pressure to about one-third volume and cooled, and the solid 4-(p-fluorophenyl)-2-nitroaniline that precipitates is isolated, dried, and used without further purification. To a solution obtained by warming 85 g. of this intermediate with 800 ml. of acetic acid is added 235 ml. of concentrated hydrobromic acid, the resulting mixture is cooled to 8° C., and a solution of 50.5 g. of sodium nitrite in 156 ml. of water is added. The reaction mixture is stirred for 1 hour at 8° C. and is then treated with a mixture of 105 g. of cuprous bromide and 200 ml. of concentrated hydrobromic acid. After 30 minutes at room temperature, this mixture is heated at 70° C. for 1 hour, cooled, and made alkaline with aqueous sodium hydroxide. The alkaline mixture is extracted twice with ether, and the combined ether extracts are washed with water until neutral, dried, and evaporated under reduced pressure to give an oily residue of 2-bromo-5-(p-fluorophenyl)nitrobenzene, which can be purified by distillation under reduced pressure.

To a mixture consisting of 480 ml. of ethanol, 320 ml. of concentrated hydrochloric acid, and 286 g. of stannous chloride dihydrate is added in portions 83.5 g. of 2-bromo-5-(p-fluorophenyl)nitrobenzene while the temperature is maintained below 30° C. with the aid of an external cooling bath. The reaction mixture is then kept at room temperature for about 18 hours, made alkaline with 50 percent aqueous sodium hydroxide, and the alkaline mixture is extracted twice with ether. The combined ether extracts are washed well with water, dried, and evaporated to dryness under reduced pressure to give 2-bromo-5-(p-fluorophenyl)aniline, which is isolated, dried, and used without further purification.

The 2-bromo-5-(p-fluorophenyl)aniline intermediate is next diazotized by reaction with sodium nitrite, and the diazonium salt is converted to 2-bromo-5-(p-fluorophenyl)phenol by reaction with 50 percent sulfuric acid; the 2-bromo-5-(p-fluorophenyl)phenol in turn is converted to 2-bromo-5-(p-fluorophenyl)phenoxyacetaldehyde diethyl acetal by reaction with bromoacetaldehyde, diethyl acetal and sodium methoxide in absolute ethanol; and the acetal intermediate is finally cyclized by reaction with a mixture of phosphorus pentoxide and phosphoric acid to give the desired 7-bromo-4-(p-fluorophenyl)benzofuran starting material; all according to analogous procedures described in B (6) above.

C. Benzofuranmethanols 1. 3-Phenyl-7-benzofuranmethanol. To a slurry of 2.4 g. of magnesium in 50 ml. of ether is added a portion of a solution of 27.3 g. of 7-bromo-3-phenylbenzofuran in 250 ml. of ether and 100 ml. of tetrahydrofuran together with a crystal of iodine. The resulting mixture is heated to reflux, and after reaction begins, the remainder of the 7-bromo-3-phenylbenzofuran solution is added dropwise while heating under reflux is continued. After addition is complete, the reaction mixture is heated under reflux for 2 hours more and 6.0 g. of paraformaldehyde (previously dried over phosphorus pentoxide) is then added. The resulting reaction mixture is heated under reflux for about 18 hours, cooled, and decomposed with a slight excess of 20 percent sulfuric acid. The organic phase is separated, washed several times with water, with saturated aqueous sodium bicarbonate, and with water again until neutral, dried, and evaporated to dryness to give an oily residue that solidifies on standing. The solid product is 3-phenyl-7-benzofuranmethanol; m.p. 80.5°–81.5° C., following two crystallizations from benzene-hexane.

2. 3-(o-Fluorophenyl)-7-benzofuranmethanol, m.p. 86°–87 C., following crystallization from benzene-hexane; prepared by the procedure of C (1) above from 30.0 g. of 7-bromo-3-(o-fluorophenyl)benzofuran. The initial product, b.p. 124°–215° C./0.2–0.5 mm. Hg., is purified by chromatography on neutral alumina. The purified product is isolated from the fractions eluted by a 20:1 ethyl acetate-methanol solvent mixture.

3. 3-(o-Chlorophenyl)-7-benzofuranmethanol. To a stirred solution of 5.0 g. of 7-bromo-3-(o-chlorophenyl)benzofuran in 50 ml. of ether, cooled to −4° C., is carefully added 10 ml. of a 15 percent n-butyllithium in heptane solution, and the resulting mixture is stirred for 2 hours at −4° C. and then for 1 hour at room temperature. A solution of 1.0 g. of paraformaldehyde in 25 ml. of tetrahydrofuran is next added, and the reaction mixture is heated under reflux for about 18 hours. Upon cooling, it is decomposed with a slight excess of 20 percent sulfuric acid, and the organic phase is separated, washed with water, with saturated acqueous sodium bicarbonate, and with water again until neutral, and evaporated to dryness to give an oily residue that is purified by chromatography on neutral alumina. The desired 3-(o-chlorophenyl)-7-benzofuranmethanol is obtained an as oil that is suitable for use without further purification from the fractions eluted with a 20:1 ethyl acetate-methanol solvent mixture.

4. 3-(p-Fluorophenyl)-7-benzofuranmethanol, m.p. 89°–90 C., following crystallization from benzene-hexane; obtained by the procedure described in C (1) above from 7-bromo-3-(p-fluorophenyl)benzofuran.

5. 3-(p-Chlorophenyl)-7-benzofuranmethanol, m.p. 112°–113° C., following two crystallizations from benzene-hexane; obtained by the procedure described in C (1) above from 7-bromo-3-(p-chlorophenyl)benzofuran.

6. 4-Phenyl-7-benzofuranmethanol; obtained as an oil that is suitable for use without further purification by the procedure described in C (1) above. The purified product is obtained following chromatography on neutral alumina with elution of the column by a 9:1 ethyl acetate-methanol solvent mixture.

7. 4-(p-Fluorophenyl)-7-benzofuranmethanol; obtained as an oil that is suitable for use without further purification by the procedure described in C (1) above. The purified product is obtained following chromatography on neutral alumina with elution of the column by a 9:1 ethyl acetate-methanol solvent mixture.

D. Benzofuranmethyl bromides 1. 3-Phenyl-7-benzofuranmethyl bromide. To a stirred solution of 9.6 g. of 3-phenyl-7-benzofuranmethanol in 100 ml. of ether, cooled in an ice-bath, is added dropwise a solution of 1.5 ml. of phosphorus tribromide in 25 ml. of ether, and the resulting mixture is stirred at room temperature for 2 hours. The ethereal phase is decanted and set aside. The residue is washed with fresh ether, and the ether washings are combined with the ethereal phase set aside earlier. The combined ether solution is then thoroughly mixed with 50 percent aqueous sodium hydroxide, separated again, dried over solid potassium hydroxide, and evaporated to dryness under reduced pressure to give a solid residue of 3-phenyl-7-benzofuranmethyl bromide; m.p. 71°–73° C.

2. 3-(o-Fluorophenyl)-7-benzofuranmethyl bromide; obtained as a colorless solid by the procedure of D (1) above from 3-(o-fluorophenyl)-7-benzofuranmethanol.

3. 3-(o-Chlorophenyl)-7-benzofuranmethyl bromide; obtained as a colorless solid by the procedure of D (1) above from 3-(o-chlorophenyl)-7-benzofuranmethanol.

4. 3-(p-Fluorophenyl)-7-benzofuranmethyl bromide; obtained as a colorless solid by the procedure of D (1) above from 3-(p-fluorophenyl)-7-benzofuranmethanol.

5. 3-(p-Chlorophenyl)-7-benzofuranmethyl bromide, m.p. 91°–93° C.; obtained by the procedure of D (1) above from 3-(p-chlorophenyl)-7-benzofuranmethanol.

6. 4-Phenyl-7-benzofuranmethyl bromide; obtained as an oil that is suitable for use without further purification by the procedure of D (1) above from 4-phenyl-7-benzofuranmethanol.

7. 4-(p-Fluorophenyl)-7-benzofuranmethyl bromide; obtained by the procedure of D (1) above from 4-(p-fluorophenyl)-7-benzofuranmethanol.

E. Benzofuranacetonitriles 1. 3-Phenyl-7-benzofuranacetonitrile. A solution of 2.45 g. of sodium cyanide in 20 ml. of water is added to a solution of 11.4 g. of 3-phenyl-7-benzofuranmethyl bromide in 100 ml. of acetone, and the resulting mixture is stirred and heated under reflux for 30 minutes and then evaporated under reduced pressure. The residue is dissolved in a mixture of ether and acetone, and the solution obtained is washed with water until neutral, dried, and evaporated to dryness under reduced pressure to give a solid residue of 3-phenyl-7-benzofuranacetonitrile; m.p. 108°–110° C., following crystallization from benzene-hexane.

2. 3-(o-Fluorophenyl)-7-benzofuranacetonitrile; obtained as an oil that is suitable for use without further purification by the procedure of E (1) above from 3-(o-fluorophenyl)-7-benzofuranmethyl bromide.

3. 3-(o-Chlorophenyl)-7-benzofuranacetonitrile; obtained by the procedure of E (1) above from 3-(o-chlorophenyl)-7-benzofuranmethyl bromide.

4. 3-(p-Fluorophenyl)-7-benzofuranacetonitrile, m.p. 103°–110° C.; obtained by the procedure of E (1) above from 3-(p-fluorophenyl)-7-benzofuranmethyl bromide.

5. 3-(p-Chlorophenyl)-7-benzofuranacetonitrile, m.p. 125°–128° C., following crystallization from acetonitrile; obtained by the procedure of E (1) above from 3-(p-chlorophenyl)-7-benzofuranmethyl bromide.

6. 4-Phenyl-7-benzofuranacetonitrile; obtained as an oil that is suitable for use without further purification according to the procedure described in E (1) above from 4-phenyl-7-benzofuranmethyl bromide.

7. 4-(p-Fluorophenyl)-7-benzofuranacetonitrile; obtained by the procedure of E (1) above from 4-(p-fluorophenyl)-7-benzofuranmethyl bromide.

F. α-Alkyl-benzofuranacetonitriles

1. α-Methyl-3-phenyl-7-benzofuranacetonitrile. A solution of 5.4 g. of 3-phenyl-7-benzofuranacetonitrile in 45 ml. of dimethyl sulfoxide is added dropwise at room temperature to a suspension of 1.1 g. of a 55 percent sodium hydride in mineral oil dispersion in 15 ml. of dimethyl sulfoxide, and the resulting mixture is stirred at room temperature for 5 hours. It is then cooled to 0° C., 6.6 g. of methyl iodide is added, and the reaction mixture is stirred at room temperature for about 18 hours. Additional methyl iodide (5 ml.) is then added, and the mixture is stirred for 1 hour more and decomposed with dilute acetic acid. The acidic mixture is extracted with ether, and the ether extract is washed with water, with saturated aqueous sodium bicarbonate, and with water again until neutral, dried, and evaporated to dryness under reduced pressure to give an oily residue of α-methyl-3-phenyl-7-benzofuranacetonitrile, suitable for use without further purification.

2. α-Ethyl-3-phenyl-7-benzofuranacetonitrile; obtained as an oil that is suitable for use without further purification by the procedure of F (1) above from 3-phenyl-7-benzofuranacetonitrile and ethyl bromide.

3. 3-Phenyl-α-propyl-7-benzofuranacetonitrile; obtained as an oil that is suitable for use without further purification by the procedure of F (1) above from 3-phenyl-7-benzofuranacetonitrile and n-propyl bromide.

G. Benzofuranacetic acid esters

1. Ethyl 2-methyl-7-phenyl-4-benzofuranacetate. To a cooled, stirred solution of 60.0 g. of 4-phenyl-1,3-cyclohexanedione in 225 ml. of methanol is first added carefully a solution of 20.2 g. of potassium hydroxide in 30 ml. of water and then 33.3 g. of chloro-2-propanone. The resulting solution is kept at room temperature for 2 days, then filtered, and to the filtrate is added 27 ml. of 50 percent aqueous sodium hydroxide. The alkaline mixture is then concentrated to a small volume, the concentrate is diluted with water, and the aqueous mixture is extracted with chloroform. The chloroform extract is discarded, the aqueous phase is acidified with concentrated hydrochloric acid, and the acidic mixture is extracted with chloroform. The chloroform extract is washed with water, dried, and evaporated to dryness to give a solid residue of 2-acetonyl-4-phenyl-1,3-cyclohexanedione, suitable for use in the next step without further purification.

A mixture consisting of the above intermediate, 2 g. of p-toluenesulfonic acid, and 500 ml. of toluene is heated under reflux under a water separator for 16 hours and is then evaporated under reduced pressure to give a mixture of 6,7-dihydro-2-methyl-5-phenylbenzofuran-4(5H)-one and 6,7-dihydro-2-methyl-7-phenylbenzofuran-4(5H)-one. The more reactive 7-phenylketone intermediate is separated from this mixture with the use of (carboxymethyl)trimethylammonium chloride hydrazide (Girard's T Reagent). Following crystallization from ethanol, the desired 6,7-dihydro-2-methyl-7-phenylbenzofuran-4(5H)-one has m.p. 96.5°–99° C.

A mixture consisting of 19.9 g. of 6,7-dihydro-2-methyl-7-phenylbenzofuran-4(5H)-one, 29.0 g. of ethyl bromoacetate, 24.9 g. of zinc (granular; activated by treatment with 1 N hydrochloric acid), and 500 ml. of benzene is stirred and heated under reflux for 2 days. During this period, four additions of 3.8 g. each of ethyl bromoacetate and 7.3 g. each of zinc are made to the reaction mixture. After cooling, the mixture is treated with 800 ml. of 10 percent sulfuric acid, and the organic phase is separated, washed with water, dried, and evaporated to dryness to give an oily residue of ethyl 6,7-dihydro-2-methyl-7-phenylbenzofuran-$\Delta^{4(5H),\alpha}$-acetate, suitable for use without further purification. A stirred mixture of 26.0 g. of this ester intermediate and 2.9 g. of sulfur is slowly heated to 220° C. and kept at this temperature for 30 minutes to give the desired ethyl 2-methyl-7-phenyl-4-benzofuranacetate starting material as an oily liquid that is suitable for use without further purification.

2. Ethyl α-methyl-7-phenyl-4-benzofuranacetate. To a stirred solution of 112.9 g. of 4-phenyl-1,3-cyclohexanedione in 600 ml. of methanol is first carefully added a solution of 34 g. of potassium hydroxide in 180 ml. of water and then 100 g. of 3-bromopyruvic acid while the temperature is maintained below 20° C. The resulting mixture is kept overnight at room temperature and then concentrated to near dryness. The residue is treated with 500 ml. of water and 3 ml. of concentrated hydrochloric acid, and the aqueous mixture is heated on a steam bath for 2.5 hours and cooled. The solid precipitate, which is a mixture of 4,5,6,7-tetrahydro-4-oxo-7-phenylbenzofuran-3-carboxylic acid and 4,5,6,7-tetrahydro-4-oxo-5-phenylbenzofuran-3-carboxylic acid, is isolated and fractionally crystallized from ethanol to give 4,5,6,7-tetrahydro-4-oxo-7-phenyl-benzofuran-3-carboxylic acid; m.p. 135.5°–138° C., which is the desired intermediate for the following reaction step.

A mixture consisting of 7 g. of the above intermediate, 0.7 g. of copper powder, 5 ml. of pyridine, and 30 ml. of diethylene glycol is heated under reflux for 2 days, cooled, and acidified with 1 N hydrochloric acid, and the acidic mixture is extracted with ether. The ether extract is washed with water and with aqueous sodium bicarbonate, dried, and evaporated to give an oily residue of 6,7-dihydro-7-phenylbenzofuran-4(5H)-one. This ketone intermediate is next reacted with ethyl 2-bromopropionate and zinc to give ethyl α-methyl-6,7-dihydro-7-phenyl-4-benzofuranacetate, which in turn is dehydrogenated by reaction with sulfur to give ethyl α-methyl-7-phenyl-4-benzofuranacetate according to the analogous procedures described in G (1) above.

3. Ethyl 7-(o-fluorophenyl)-α-methyl-4-benzofuranacetate. A mixture of 276 mg. of sodium and 68 g. of (o-fluorophenyl)-2-propanone is stirred and heated at 95° C. until the sodium melts and dissolves. The mixture is cooled to 80° C., and then 15.9 g. of acrylonitrile is added dropwise with stirring over a 15 minute period. The mixture is stirred an additional 15 minutes, cooled, and neutralized with 2 ml. of acetic acid. This mixture is extracted with ether. The ether extract is washed with water, dried, and evaporated, and the residue is fractionally distilled under reduced pressure to give a forerun of unreacted (o-fluorophenyl)-2-propanone followed by the desired product, 4-(o-fluorophenyl)-5-oxohexanonitrile.

A solution of 40 g. of 4-(o-fluorophenyl)-5-oxo-hexanonitrile and 72 g. of hydrogen chloride in 200 ml. of anhydrous methanol is stirred and heated under reflux for 2 hours and then allowed to stand at room temperature for 16 hours. The resulting mixture is cooled to 0°–5° C., diluted with 500 ml. of water, and extracted with ether. The ether extract is washed with water, with aqueous sodium bicarbonate, and with saturated aqueous chloride, dried, and evaporated to give a residue of 4-(o-fluorophenyl)-5-oxohexanoic acid, methyl ester. The product is purified by distillation under reduced pressure.

A solution of sodium methoxide is prepared from 8.45 g. of sodium and 137 ml. of anhydrous methanol, and to it is added 83.6 g. of 4-(o-fluorophenyl)-5-oxohexanoic acid, methyl ester. The reaction mixture is stirred and heated under reflux for 2 hours, cooled, and treated with 26 ml. of acetic acid. The mixture is evaporated at reduced pressure, and the residue is partitioned between water and ether. The ether phase is separated, and the aqueous phase is extracted with several portions of ether. The ether fractions are combined and extracted with dilute aqueous sodium hydroxide. The alkaline extract is acidified with dilute sulfuric acid and extracted with ether. This ether extract is washed with water, dried, and evaporated to give a residue of 4-(o-fluorophenyl)cyclohexane-1,3-dione.

Utilizing the analogous procedures described in G (2) above, the 4-(o-fluorophenyl)cyclohexane-1,3-dione is ultimately converted to the desired ethyl 7-(o-fluorophenyl)-α-methyl-4-benzofuranacetate starting material by reaction with 3-bromopyruvic acid to give 7-(o-fluorophenyl)-4,5,6,7-tetrahydro-4-oxobenzofuran-3-carboxylic acid; decarboxylation of this acid intermediate by heating it in diethylene glycol in the presence of copper powder and pyridine to give 7-(o-fluorophenyl)-6,7-dihydrobenzofuran-4(5H)-one; reaction of this ketone intermediate with ethyl 2-bromopropionate and zinc to give ethyl 6,7-dihydro-7-(o-fluorophenyl)-α-methyl-4-benzofuranacetate; and dehydrogenation of this ester intermediate by reaction with sulfur.

4. Ethyl 7-(o-chlorophenyl)-4-benzofuranacetate; obtained as an oil that is suitable for use without further purification by the procedures described in G (2) and (3) above from the following series of reaction. (o-Chlorophenyl)-2-propanone is first converted to 4-(o-chlorophenyl)-5-oxohexanonitrile by reaction with sodium and acrylonitrile; the 4-(o-chlorophenyl)-5-oxohexanonitrile is converted to 4-(o-chlorophenyl)-5-oxohexanoic acid, methyl ester by reaction with hydrogen chloride in methanol; this ester intermediate is reacted with sodium and methanol to give 4-(o-chlorophenyl)cyclohexane-1,3-dione; this diketone intermediate is reacted with 3-bromopyruvic acid and the 7-(o-chlorophenyl)-4,5,6,7-tetrahydro-4-oxobenzofuran-3-carboxylic acid product is decarboxylated by heating it in diethylene glycol in the presence of copper powder and pyridine to give 7-(o-chlorophenyl)-6,7-dihydrobenzofuran-4(5H)-one; this ketone intermediate is then reacted with ethyl 2-bromoacetate and zinc to give ethyl 7-(o-chlorophenyl)-6,7-dihydrobenzofuran-$\Delta^4$(5H), α -acetate, which is finally dehydrogenated with sulfur to give the desired ethyl 7-(o-chlorophenyl)-4-benzofuranacetate starting material.

H. 7-Phenyl-3-benzofuranmalonic acids 1. 7-Phenyl-3-benzofuranmalonic acid. To a mixture consisting of 36.8 g. of diethyl malonate, 22.1 g. of ethanol, and 5.53 g. of magnesium is added 5 drops of carbon tetrachloride. Following the initial vigorous reaction, 100 ml. of ether is added, and the resulting mixture is heated under reflux for 1 hour. To the reaction mixture is then added drop wise a solution of 56.6 g. of 2-biphenylyloxyacetyl chloride in 50 ml. of ether, and the resulting mixture is stirred and heated under reflux for 30 minutes and then stirred at room temperature for about 18 hours. The cooled reaction mixture is decomposed with dilute sulfuric acid, and the organic phase is separated, washed with water, with saturated aqueous sodium bicarbonate, and with water again until neutral, dried, and evaporated to dryness under reduced pressure. The major portion of this oily residue (60 g.) is dissolved in 30 ml. of methanol, and the solution is added dropwise with stirring at 35° C. to 900 ml. of a saturated aqueous solution of cupric acetate. The resulting mixture is stirred at room temperature for 24 hours, and the solid that is obtained is isolated, dried, and triturated with ether. The solid obtained after trituration is mixed well with 70 percent sulfuric acid, and the acidic mixture is extracted with ether. The ether extract is washed with sulfuric acid, with water, with saturated aqueous sodium bicarbonate, and with water again until neutral, dried, and evaporated to dryness to give diethyl 2-biphenylyloxyacetylmalonate as an oil that is suitable for use without further purification.

To a mixture formed by adding 145 g. of phosphorus pentoxide to 110 ml. of phosphoric acid, stirred and heated at 60° C., is added 17.1 g. of diethyl 2-biphenylyloxyacetylmalonate, and the resulting mixture is stirred and heated at 76°–78° C. for 3.5 hours. Upon cooling, it is poured into water, and the aqueous mixture is extracted with ether. The ether extract is washed with water, with saturated aqueous sodium bicarbonate, and with water again until neutral, dried, and evaporated to dryness to give diethyl 7-phenyl-3-benzofuranmalonate, suitable for use without further purification.

To a solution of 9.5 g. of diethyl 7-phenyl-3-benzofuranmalonate in 100 ml. of ethanol is added a solution of 16.0 g. of potassium hydroxide in 50 ml. of water, and the resulting solution is heated under reflux for 4.5 hours and then concentrated to near dryness under reduced pressure. The residue is dissolved in water, and the aqueous solution is washed with ether and acidified with dilute hydrochloric acid. The acidic aqueous mixture is extracted with ether, and the ether extract is dried over anhydrous sodium sulfate and evaporated under reduced pressure to give an oily residue of 7-phenyl-3-benzofuranmalonic acid, suitable for use without further purification.

2. 7-(o-Fluorophenyl)-3-benzofuranmalonic acid. To a solution of 18.7 g. of 2-(o-fluorophenyl)aniline in 250 ml. of acetic acid is added 25 ml. of concentrated sulfuric acid. To the resulting mixture, cooled to 5° C., is added dropwise a solution of 7.6 g. of sodium nitrite in 50 ml. of water while the temperature is maintained below 8° C., and the reaction mixture is stirred for 15 minutes. This diazonium salt solution is then added dropwise to 250 ml. of boiling 50 percent sulfuric acid, and the reaction mixture is heated under reflux for 10 minutes. Upon cooling, it is extracted with ether, and the ether extract is dried and evaporated to dryness to give 2-(o-fluorophenyl)phenol, suitable for use without further purification.

To a solution of 18.8 g. of the above phenol intermediate in 200 ml. of acetone is added 18.4 g. of ethyl bromoacetate and 41.4 g. of potassium carbonate, and the resulting mixture is heated under reflux for about 18 hours. The solution obtained is filtered, the filtrate is evaporated to remove the solvent, and the residue is dissolved in a solution of 25 g. of potassium hydroxide in 100 ml. of water and 250 ml. of ethanol. This solution is heated under reflux for 1 hour and evaporated to remove solvent, and the residue is dissolved in water. The aqueous solution is washed with ether and acidified with dilute hydrochloric acid to give a solid precipitate of 2-[(o-fluorophenyl)phenoxy]acetic acid, which is isolated, dried, and used without further purification. To a solution of 24.6 g. of this acid intermediate in 250 ml. of benzene is added 119 g. of thionyl chloride, and the resulting mixture is heated under reflux for about 18 hours and then evaporated under reduced pressure to give 2-[(o-fluorophenyl)phenoxy]acetyl chloride.

The acid chloride intermediate (61.0 g.) is reacted with diethyl malonate and magnesium in ethanol to give diethyl 2-[(o-fluorophenyl)phenoxy]acetylmalonate, and the malonic ester intermediate is cyclized by reaction with phosphorus pentoxide in phosphoric acid to give diethyl 7-(o-fluorophenyl)-3-benzofuranmalonate, which is saponified with aqueous potassium hydroxide to give the desired 7-(o-fluorophenyl)-3-benzofuranmalonic acid, all according to analogous procedures described in H (1) above.

We claim:

1. A member of the class consisting of benzofuranacetic acid compounds that are represented by the formula

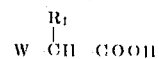

and pharmaceutically acceptable salts thereof; where $R_1$ is a member of the class consisting of hydrogen and a lower alkyl group having not more than four carbon atoms, and W represents a member of the class consisting of a 3-phenyl-7-benzofuran- group having the formula

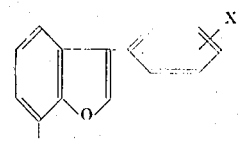

a 4-phenyl-7-benzofuran- group having the formula

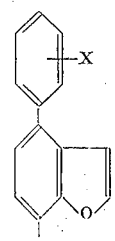

a 7-phenyl-4-benzofuran- group having the formula

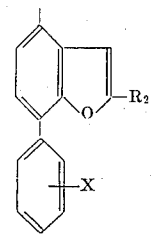

and a 7-phenyl-3-benzofuran- group having the formula

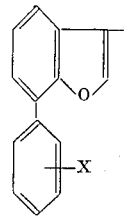

where $R_2$ is a member of the class consisting of hydrogen and methyl and X is a member of the class consisting of hydrogen, fluorine, and chlorine.

2. A compound according to claim 1 which is α-methyl-3-phenyl-7-benzofuranacetic acid.

3. A compound according to claim 1 which is 3-(o-fluorophenyl)-7-benzofuranacetic acid.

4. A compound according to claim 1 which is 4-phenyl-7-benzofuranacetic acid.

5. A compound according to claim 1 which is 2-methyl-7-phenyl-4-benzofuranacetic acid.

6. A compound according to claim 1 which is 7-phenyl-3-benzofuranacetic acid.

* * * * *